Aug. 12, 1958  G. R. COLONT  2,846,769
MEASURING DEVICE
Filed Oct. 21, 1955  2 Sheets-Sheet 1

INVENTOR.
GEORGE R. COLONT
BY
ATTORNEY

Aug. 12, 1958　　　G. R. COLONT　　　2,846,769
MEASURING DEVICE
Filed Oct. 21, 1955　　　2 Sheets-Sheet 2
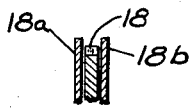
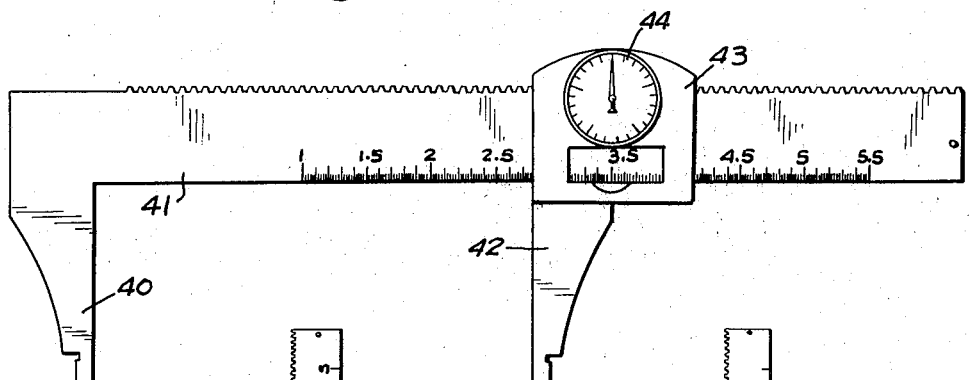
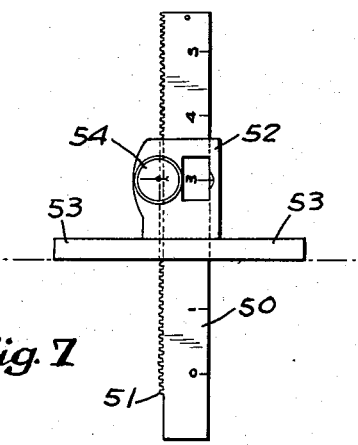
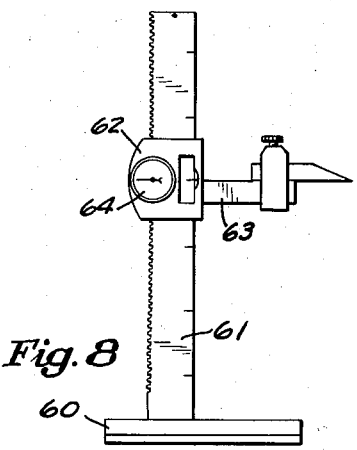
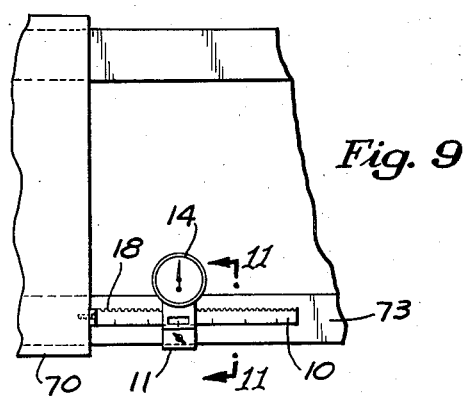
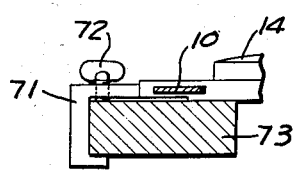
INVENTOR.
GEORGE R. COLONT
BY
ATTORNEY.

United States Patent Office 2,846,769
Patented Aug. 12, 1958

2,846,769

MEASURING DEVICE

George R. Colont, Detroit, Mich.

Application October 21, 1955, Serial No. 542,008

5 Claims. (Cl. 33—125)

This invention relates to measuring instruments which are adapted for use either as hand measuring instruments or may be incorporated into the construction of various machines for measuring operative movements of the working tools and other parts thereof.

At the present time, precision machining of metals is done to accuracy of thousandths of an inch with a range of tolerances within three-thousandths of an inch being in wide use for many types of regular machining work. However, accuracy with tolerances within only one-thousandth of an inch is also becoming more common. Such accuracy of machining requires measuring instruments of greater precision. At the present time, there is a large number of hand measuring instruments including graduated scales which are divided into full inches as well as into smaller portions thereof, such as one sixty-fourth of an inch in fractional graduations and twenty thousandths of an inch in decimal graduations. Graduating scales into still smaller portions of an inch, while also done in some instances, is not considered practical due to the difficulty of reading such scales. Inasmuch as greater precision of measurements than that afforded by the smallest graduation is required from the instruments, including such scales, be they calipers, height gauges, depth gauges and similar instruments, such instruments are often provided with slides including verniers with graduations in fortieths of an inch, i. e., .025 of an inch each. With such verniers, obtaining a reading within one thousandth of an inch is theoretically possible. However, in practical application of these devices and considering the difficulty in reading graduations on the verniers and on the scale and deciding which of these graduations coincide, the actual precision of such measurements is not as accurate. Moreover, making a mistake in reading a vernier is a usual occurrence, and reading a vernier requires certain skill, may require magnifying glass, and takes considerable time.

For more accurate measurements there are provided measuring instruments known as micrometers and dial indicators. However, the range of measurements in a micrometer is usually one inch, and if a dimension to be measured is larger, such as, for instance, 5.325 inches, it is necessary to procure and use a micrometer measuring within the range from five inches to six inches, usually known as 5″ to 6″ micrometers. Thus, to be able to measure various dimensions from, say, zero to ten (10) inches, with the accuracy of one thousandth of an inch, one must have a large number of micrometer devices which are rather expensive. There are micrometers including inserts, or "anvils," in full inches that are inserted into the micrometer of a wide range to decrease the range thereof for measuring smaller dimensions. However, such micrometers have various disadvantages and are not acceptable in many instances.

The dial indicators have been found to be accurate and convenient in use. However, their range is still more limited than that of micrometers and is usually limited to the number of one thousandths of an inch marked on the dial of the indicator, usually one hundred thousandths of an inch, fifty thousandths of an inch, twenty-five thousandths of an inch, and some times ten thousandths of an inch. In view of the above, dial indicators are used only for measurements within very small range, such, for instance, as for measuring the thickness of sheet stock, or measuring inaccuracy in running of machine parts, and in similar instances.

Thus, there is a great need for a measuring instrument which could give a quick reading of various dimensions of considerable length, such as dimensions between six (6) inches to sixty (60) inches and even more, with accuracy similar to that given by micrometers and dial indicators. However, in spite of the great need for such an instrument, no practical instrument of this nature has yet been produced, and measuring of such relatively large dimensions is still done with the aid of various vernier scales and similar devices.

One of the objects of the present invention is to provide an improved measuring instrument whereby the above difficulties and disadvantages are overcome and largely eliminated, and measuring of relatively large dimensions can be done with accuracy equal to or even greater than that obtainable with vernier scale measuring instruments but without the necessity of reading vernier scales.

Another object of the present invention is to provide an improved measuring instrument which can be used either as a hand measuring instrument such as calipers, height gauge, depth gauge, or which can be incorporated into the construction of various metal working machines such as drill presses, lathes, milling machines, boring machines, and the like, and give easily read measurements of dimensions of considerable size.

A still further object of the present invention is to provide an improved measuring instrument which may be constructed to various degrees of precision.

A still further object of the present invention is to provide an improved measuring instrument in which the backlash inherent in various driving mechanisms used therein is eliminated and does not affect accuracy of measurements.

An added object of the present invention is to provide an improved measuring instrument of the foregoing nature which is simple and rugged in construction, dependable in operation and is relatively inexpensive to manufacture and to service.

Further objects and advantages of this invention will be apparent from the following description and appended claims, reference being had to the accompanying drawings forming a part of this specification, wherein like reference characters designate corresponding parts in the several views.

Fig. 6 is an elevational view showing caliper measuring device embodying the present invention.

Fig. 7 is an elevational view showing a depth gauge embodying the present invention.

Fig. 8 is an elevational view showing a height gauge embodying the present invention.

Fig. 9 is a top view showing a portion of a machine lathe including measuring mechanism embodying the present invention.

Fig. 10 is an end view partly in section illustrating adjusting means for the measuring mechanism used in the construction of Fig. 9, to set the zero point of the measuring mechanism at a desired point.

Fig. 11 is a sectional view taken in the direction of the arrows on the section plane passing through the line 11—11 of Fig. 9 and illustrating a rack construction including side rack guards intended to protect the rack from nicking.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

In accordance with the present invention, I provide a measuring instrument or mechanism in which full inches and certain predetermined smallest portions thereof are read from a scale correspondingly graduated, while thousandths of an inch are read from a dial indicator mounted on a slide or in other suitable manner for moving relatively to said graduated scale. The indicator dial is graduated into as many thousandths of an inch as are contained in the smallest graduation provided on the scale. The dial hand is drivingly connected with the scale in any suitable manner. In the present embodiment of the invention, the driving connection is effected through a rack or a similar device provided on the scale and a train of gears operatively disposed between the rack and the indicator hand shaft. Thus, full inches and the smallest portions thereof graduated on the scale are read from such scale, while the excess beyond such smallest graduations is read in thousandths of an inch from the indicator dial. Thus, my measuring device includes in itself the advantages of scale measurements and of dial meaurements, the scale and the dial indicator operating in combination to give a reading of a relatively large dimension with the accuracy obtainable from dial indicators. My improved mechanism may be incorporated into various metal working machines, such as drill presses, vertical and horizontal milling machines, machine lathes, boring machines, grinding machines and the like. In incorporating my measuring mechanism into such machines, it is important that the scale be connected to one machine part and the slide cooperating with said scale be mounted on another part of the machine, with such machine parts movable relative to each other. In certain instances, it may be advantageous to substitute the scale by one or more dial indicators giving reading in full inches and in predetermined smallest portions thereof.

Figure 1:
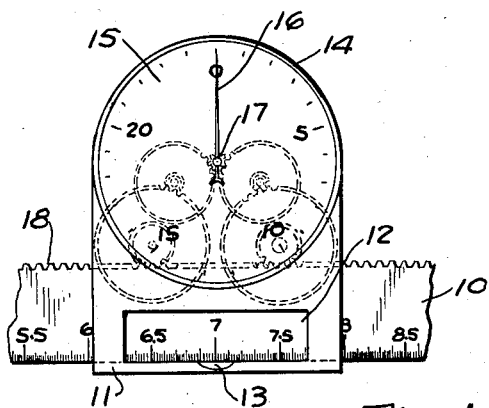
Fig. 1 is a fragmentary elevational view showing a measuring instrument or mechanism embodying the present invention.
Figure 2:
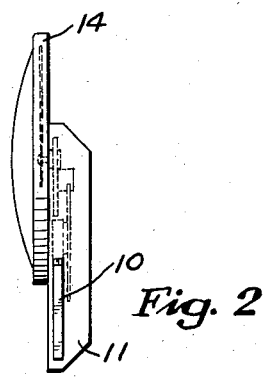
Fig. 2 is an end view of the construction of Fig. 1.
Figure 3:
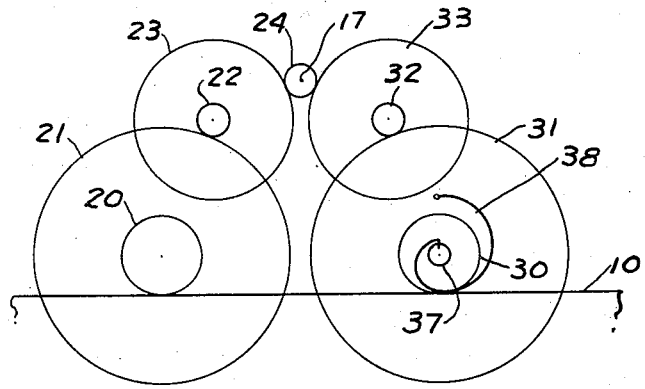
Fig. 3 is a diagrammatic view illustrating the gear trains which the construction of Fig. 1 includes.
Figure 4:
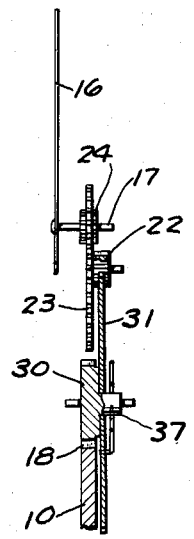
Fig. 4 is a view similar in part to Fig. 2 and showing the inside construction of the slide, with the casing thereof being removed.
Figure 5:
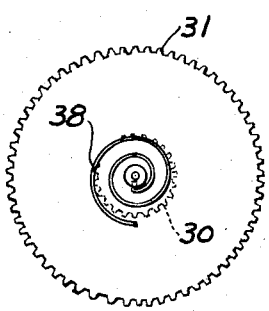
Fig. 5 is a fragmentary elevational view showing backlash eliminating means employed in the construction of Fig. 1.

Referring to the drawings and particularly to Figs. 1–5 thereof, the measuring instrument or mechanism illustrated therein comprises a ruler 10 having provided thereon graduations in full inches and on fortieths of an inch. Thus, the smallest division on the scale is one-fortieth of an inch, or twenty-five thousandths of an inch. On the ruler 10 there is provided a slide 11 having a window 12 and a mark 13, whereby position of the slide with respect to the scale on the ruler 10 may be read in a manner well known in the art. On the slide 11 there is mounted a dial indicator 14 having a dial 15 and a hand 16. The dial 15 is divided into twenty-five portions, each representing one thousandth of an inch.

Means are provided to connect drivingly the shaft 17 of the hand 16 with the ruler 10. The driving ratio of such driving connection is 1:40. Therefore, when the slide is moved along the scale for one full inch, the hand 16 of the indicator makes forty revolutions. If the slide is moved along the scale through one smallest division graduated thereon, which is one-fortieth of an inch or twenty-five thousandths of an inch, the hand 16 will make one full revolution. On the other hand, if the slide 11 is moved through a distance equal to one twenty-fifth of the smallest division, or only one thousandth of an inch, the hand 16 will move on the dial through one twenty-fifth of one revolution, i. e., through one division graduated on the dial and representing one thousandth of an inch.

The driving means in the present embodiment of the invention comprises a driving gear 20 cooperating with a rack 18 provided on the ruler 10. The gear 20 is mounted on the same shaft with a gear 21 which meshes with a small gear 22. The gear 22 is mounted on the same shaft with a larger gear 23 which is in mesh with the gear 24 provided on the indicator hand shaft 17.

In the embodiment illustrated the number of teeth on the gear 20 is equal to that provided in one inch of the rack 18. Therefore, the driver gear 20 makes one full revolution for one inch travel of the slide 11. The gear 20 meshing with gear 22 has eight (8) times as many teeth as has the gear 22 and, therefore, the gears 22 and 23 mounted on the same shaft make eight (8) revolutions for one inch travel of the slide 11 on the ruler 10. The number of teeth on the gear 23 is five (5) times the number of teeth on the gear 24 and, therefore, the gear 24 and the shaft 17 rotate through five full revolutions for one revolution of the gear 22, or forty (40) revolutions for one rotation of the gear 20, or one inch travel of the slide 11 on the ruler 10.

Means are provided to eliminate the backlash inherent in gear trains and similar connections and affecting accuracy of measurement when rotation of the gears in the train is reversed, which condition tends to occur in the mechanism described above when movement of the slide 11 on the rack 18 changes direction. In the present embodiment of the invention, said means comprise a second gear train identical to the train of gears including gears 20, 21, 22 and 23. Said second train includes gears 30, 31, 32 and 33, with the gear 30 being in mesh with the rack 18, while the gear 30 meshes with gear 24 of the shaft 17. While the gears 20 and 21 are mounted on the same shaft and are secured thereto positively for rotation with each other under all conditions, the gear 30 is mounted for rotation on the shaft 37 to which the gear 30 is positively secured. Driving connection between the shaft 37 and the gear 31 is effected through spiral spring 38 always tending to urge all of the gears of both trains in one direction and keeping them in tight resilient contact, thus eliminating the backlash between the gears. By virtue of gear 30 and the remaining gears of the second train being in mesh with the rack 18, spring 38 may be relatively small.

Fig. 6 shows calipers in which one jaw 40 is made integral or is otherwise secured to the ruler 41 having a scale, while the other jaw 42 is secured to the slide 43. The dial 44 is mounted on the slide and may be of a smaller size than in the construction of Fig. 1 since the calipers are a hand instrument and the user can look closer at the dial. The driving means and other construction of the mechanism within the slide may be substantially similar to that illustrated in Figs. 1–5 and described above.

Fig. 7 illustrates a depth gauge having a rod ruler 50 provided with suitable graduated scale and a rack 51. The slide 52 is provided with base wings 53 which may have hardened and ground base surfaces. A dial 54 is incorporated into the slide 52 similarly to the dial 44 of the construction of Fig. 6.

Fig. 8 illustrates a height gauge having a base 60 and a graduated column 61. A slide 62 carries an arm 63 and has a dial indicator 64. Operation of the dial and of the slide is similar to that of the constructions of Figs. 6 and 7.

Fig. 9 illustrates a portion of a lathe to which there is operatively connected a measuring device embodying the present invention. In the embodiment illustrated, the ruler 10 of the measuring mechanism substantially similar to that described in Figs. 1–5 is secured to the carriage 70 of the lathe, while the slide 11 is connected in any suitable manner, such as with the aid of a clamp 71 and screw 72, to the bed 73 of the lathe. As the carriage 70 and the ruler 10 carried thereby move along the bed 73 of the lathe, the rack 18 of the ruler 10 operates the mechanism driving the dial indicator 14, thus enabling the operator of the lathe to read from the scale 10 and the dial indicator the distance through which the carriage moved with respect to the bed 73, thus giving this distance with accuracy to a thousandth of an inch.

The slide 11 may be set at zero mark on the scale 10 at any desired position of the carriage 70 along the bed 73 by loosening the screw 72 and bringing the mark on the slide to the zero point. By virtue of such an expedient, it is not necessary to provide excessively long scales, and the measurement with the device described above may be made from any surface on the work. A second scale or a second set of numerical designations may be provided on the ruler 10 in order to have the zero point either at the left hand or at the right hand of the scale, depending on whether outside turning operations or boring operations are performed.

The dial indicator in the construction of Figs. 9 and 10 is disposed horizontally in order to enable the operator to read the dial more conveniently by looking downwardly. As can be seen from an examination of the drawings, the dial used in mechanisms incorporated into machines may be larger than the dial incorporated into hand measuring instruments such as those shown in Figs. 6–8. In hand instruments the dial can be read at a closer distance. On the other hand, with machines it is desirable that the operator can read the indicator at a greater distance and without leaning down, which is important from the standpoint of safety.

It will be understood that a device similar to that operated by the carriage 70 and measuring the movements thereof along the bed of the lathe may also be incorporated into the support of the lathe and measure the movements of the tool post and the tool carried thereby, transversely of the bed of the lathe.

With vertical milling machines, measuring devices or mechanisms such as described above may be incorporated into the spindle of the machine as well as into the table thereof to measure movements of the work in one or more directions, as well as movements of the tool into and out of the work. In cases of other machines, my improved measuring devices or mechanisms can be provided for measuring all desired movements of the parts of the machine, and any practical number of them may be provided in a single machine.

While the embodiments of the invention described above are shown as having a dial divided into 25 thousandths of an inch, use of dials divided into 50 thousandths of an inch, and 100 thousandths of an inch may be preferable in many instances. With such dials, the construction of the driving means may be simplified and number of gears in the gear trains be reduced. For instance, with the use of an indicator divided into 100 thousandths of an inch, the scale will be divided into full inches and tenths of an inch. The gear train will have a ratio of 1:10 which may be attained with only one pair of gears.

Also, while the present embodiment of the invention describes my improved measuring device or mechanism with reference to inch and thousandth of an inch graduations, it will be understood that it is applicable with equal success to metric system graduations.

In accordance with the present invention, in any of the above disclosed constructions means may be provided to protect the rack from nicking and accumulation of dirt. Such means may be in the form of one or two rack guards provided along the rack and extending at least to the height of its teeth. The guards may be spaced from the rack body to eliminate blind corners in which dirt could accumulate and become packed in. Fig. 11 illustrates a construction in which the rack 18 is protected by two rack guards 18a and 18b.

By virtue of the constructions disclosed above, objects of the present invention listed above and numerous additional advantages are attained.

I claim:

1. In a machine having two parts movable relative to each other, a scale graduated in full inches and in predetermined portions thereof and secured to one of said parts, a slide provided on said scale and secured to the other movable part of said machine, said slide having a mark thereon adapted to be positioned on said graduated scale to produce a reading thereon as said parts of the machine are moved relative to each other, a dial indicator mounted on said slide and having a hand drivingly connected to said scale to respond to the relative movements of said scale and said slide, the dial of said indicator being divided into portions representing thousandths of an inch, with one full revolution of the dial hand being produced as the slide is moved on the scale through the distance equal to one smaller portion of an inch into which the scale is divided.

2. In a metal working machine having two parts movable relative to each other, with one of said parts carrying a tool, a scale graduated in full inches and in predetermined portions thereof and secured to one of said parts, a rack provided on said scale along the entire graduated portion thereof, a slide provided on said scale and secured to the other movable part of said machine, said slide having a mark thereon adapted to be positioned on said graduated scale to produce a reading thereon as said parts of the machine are moved relative to each other, a dial indicator mounted on said slide and having a hand drivingly connected to the rack on said scale to respond to the relative movements of said scale and said slide, the dial of said indicator being divided into portions representing thousandths of an inch, with one full revolution of the dial hand being produced as the slide is moved on the scale through the distance equal to one smaller portion of an inch into which the scale is divided, resilient means acting on the entire driving connection between the scale rack and the indicator hand to maintain said connection in constant tight resilient contact and thus to prevent occurrence of backlash between the indicator hand and the rack and means to set the slide on the zero point on the scale.

3. In a measuring instrument, a scale graduated in full inches and in predetermined portions thereof, a slide provided on said scale and having a mark thereon adapted to be positioned on said graduated scale to produce a reading thereon as the slide is moved along said scale relative thereto; a rack provided on said scale along the entire graduated portion thereof; a dial indicator mounted on said slide and including a dial, a hand shaft and a hand provided thereon; a driven gear on said hand shaft, a train of gears provided between said scale rack and said driven gear and drivingly connecting said scale and said indicator hand to respond to the relative movements of said scale and said slide, the driving ratio of said gear train being so selected that as the slide moves relative to the scale for a distance equal to the smallest division on said scale, the indicator hand rotates through one full revolution, the indicator dial being graduated into as many portions as there are thousanths of an inch in one smallest division on said graduated scale; a second gear train disposed between the hand shaft gear and the scale rack and having the same driving ratio as the first gear train, and a spring operatively interposed in said second gear train and constantly urging the gears of the first gear train in one direction to maintain them in tight operative contact and thus to eliminate the backlash tending to occur when movements of the slide are reversed.

4. In a lathe having a bed and a carriage movable therealong, a scale graduated in full inches and in predetermined portions thereof and secured to said carriage, a slide cooperating with said scale and connected to the lathe bed, said slide having a mark thereon adapted to be positioned on said graduated scale to produce a reading thereon as said carriage is moved relative to said bed, a dial indicator mounted on said slide and having a hand drivingly connected to said scale to respond to the relative movements of said scale and said slide, the dial of said indicator being divided into portions representing thousandths of an inch, with one full revolution of the dial hand being produced as the slide is moved on the scale through the distance equal to one smallest portion of an inch into which the scale is divided, and means to adjust the slide to the zero point on the scale at any position of the scale on said bed.

5. In a measuring instrument, a scale graduated in full inches and in predetermined portions thereof, a slide provided on said scale and having a mark thereon adapted to be positioned on said graduated scale to produce a reading thereon as the slide is moved along said scale relative thereto; a rack provided on said scale along the entire graduated portion thereof; a dial indicator mounted on said slide and including a dial, a hand shaft and a hand provided thereon; a driven gear on said hand shaft, a train of gears between said scale rack and said driven gear drivingly connecting said scale and said indicator hand to respond to the relative movements of said slide and said scale, the driving ratio of said gear train being so selected that as the slide moves relative to the scale for a distance equal to the smallest division on said scale, the indicator hand rotates through one full revolution, the indicator dial being graduated into as many portions as there are thousandths of an inch in one smallest inch division on said graduated scale; resilient means acting on the entire driving connection between the scale rack and the driven gear and operating to maintain said connection in constant tight resilient contact to prevent occurrence of backlash between the indicator hand and the rack.

References Cited in the file of this patent

UNITED STATES PATENTS

| | | |
|---|---|---|
| 23,564 | Gould | Apr. 12, 1859 |
| 443,869 | Riglander | Dec. 30, 1890 |
| 1,281,715 | Todt | Oct. 15, 1918 |
| 1,617,485 | Hughes | Feb. 15, 1927 |
| 1,863,007 | Elkins | June 14, 1932 |
| 2,030,320 | Ricci | Feb. 11, 1936 |
| 2,419,818 | Burton | Apr. 29, 1947 |